United States Patent [19]

Miwa

[11] Patent Number: 5,664,479
[45] Date of Patent: Sep. 9, 1997

[54] TANDEM VACUUM BOOSTER

[75] Inventor: Akihiko Miwa, Anjo, Japan

[73] Assignee: Aisin Seiki Kabushiki Kaisha, Kariya, Japan

[21] Appl. No.: 548,829

[22] Filed: Oct. 26, 1995

[30] Foreign Application Priority Data

Oct. 27, 1994 [JP] Japan .................. 6-264275

[51] Int. Cl.⁶ .................................................. F01B 19/00
[52] U.S. Cl. ............................ 92/48; 91/376 R; 91/533
[58] Field of Search ...................... 91/369.1, 369.2, 91/533, 376 R; 92/48

[56] References Cited

U.S. PATENT DOCUMENTS

| | | | |
|---|---|---|---|
| 3,083,698 | 4/1963 | Price et al. | 92/48 |
| 3,103,855 | 9/1963 | Hager et al. | 92/48 |
| 3,292,502 | 12/1966 | Myers et al. | 92/48 |
| 3,357,317 | 12/1967 | Hager | 91/533 |
| 3,603,208 | 9/1971 | Kytta | 92/48 |
| 3,760,693 | 9/1973 | Myers | 92/48 |
| 4,516,474 | 5/1985 | Ochiai | 91/533 |
| 5,014,597 | 5/1991 | Rueffer et al. | |

FOREIGN PATENT DOCUMENTS

| | | | |
|---|---|---|---|
| 0152656 | 11/1980 | Japan | 92/48 |
| 61-44917 | 12/1986 | Japan . | |

*Primary Examiner*—Thomas E. Denion
*Attorney, Agent, or Firm*—Burns, Doane, Swecker & Mathis, LLP

[57] ABSTRACT

A tandem vacuum booster includes a front shell and a rear shell which are connected to each other to form a housing, a front movable wall having an outer circumferential portion that is fit in a fluid-tight manner between the front shell and the rear shell, and a rear movable wall having an outer circumferential portion that is fixed to the rear shell. A fixed wall has an outer circumferential portion that is fit between the front movable wall and the rear shell, with the fixed wall including a bent portion which presses the outer circumferential portion of the rear movable wall to the rear shell.

7 Claims, 2 Drawing Sheets

TANDEM VACUUM BOOSTER

FIELD OF THE INVENTION

This invention relates to a booster for a brake system or a clutch system and more particularly to a tandem vacuum booster for a brake system or a clutch system of a vehicle.

BACKGROUND OF THE INVENTION

A tandem vacuum booster for a brake system is disclosed in the Japanese Utility Model No. 61(1986)-44917. The tandem vacuum booster disclosed in this document includes a front shell and a rear shell which are connected to each other in order to form a housing. The tandem vacuum booster further includes a front diaphragm, an outer circumferential portion of which is fit between the front shell and the rear shell to fluidly separate a front variable pressure chamber from a front constant pressure chamber. Also included is a rear diaphragm having an outer circumferential portion that is fixed to a stepped portion of the rear shell in order to fluidly separate a rear variable pressure chamber from a rear constant pressure chamber. The tandem vacuum booster has a fixed wall formed by two plate members that are connected to each other by welding. One of the plates is fit between the front diaphragm and the rear shell at its outer circumferential portion and the other plate is fixed to the rear diaphragm to form the front variable pressure chamber and the rear constant pressure chamber.

Unfortunately, the tandem vacuum booster referenced above is quite costly to manufacture since the fixed wall is formed by two plate members. Further, because the plate members are welded to each other, the process of manufacturing the tandem vacuum booster is relatively complicated and this leads to additional manufacturing expense.

A vacuum booster for a brake system which is intended to address the above problems is disclosed in U.S. Pat. No. 5,014,597. This tandem vacuum booster includes a fixed wall having a bent portion which presses an outer circumferential portion of the front diaphragm to a vertical portion of the front shell in order to be fixed to the front shell and the rear shell. Additionally, an outer circumferential end portion of the fixed wall is fixed to the rear diaphragm. The rear shell of the tandem vacuum booster for a brake system includes a plurality of convex portions at an outer circumferential surface thereof which define air passages between the rear diaphragm and the rear shell. Further, the front diaphragm includes a plurality of slots forming passages in order to fluidly connect the front variable pressure chamber to the rear variable pressure chamber.

Since this tandem vacuum booster possesses a fixed wall formed by an integral plate, the tandem vacuum booster is relatively low in cost as compared to the other tandem vacuum booster described above. However, this tandem vacuum booster suffers from the following problems.

First, the dies necessary for forming the rear shell are rather complicated in construction. Further, a thin portion may be generated in the outer circumferential surface of the rear shell because of the convex portions of the rear shell.

Although it may be possible to provide a plurality of slits at the outer circumferential end of the rear diaphragm instead of the convex portions of the rear shell in an attempt to address this problem, an air passage cannot then be provided in this type of construction. Accordingly, the rear variable pressure chamber cannot be fluidly connected to the front variable pressure chamber.

SUMMARY OF THE PRESENT INVENTION

In view of the foregoing, it would be desirable to provide a tandem vacuum booster which can be manufactured in a relatively simple manner.

It would also be desirable to provide a tandem vacuum booster which is simple in structure and small in size.

A need also exists for a tandem vacuum booster which is low in cost.

A further need exists for a tandem vacuum booster that is highly durable.

To address at least the foregoing needs, a tandem vacuum booster in accordance with one aspect of the present invention includes a front shell and a rear shell which are connected to each other to form a housing, a front movable wall which is fluid-tightly fit between the front shell and the rear shell at an outer circumferential portion thereof, and a rear movable wall which is fixed to the rear shell at an outer circumferential portion thereof. A fixed wall is fit between the front movable wall and the rear shell at an outer circumferential portion thereof. The fixed wall is provided with a bent portion which presses the outer circumferential portion of the rear movable wall to the rear shell.

According to another aspect of the invention, the tandem vacuum booster includes a front shell having a shoulder portion and a rear shell having a stepped portion. An outer circumferential portion of the rear shell is in contact with the shoulder portion of the front shell so that the front and rear shells form a housing. A front movable wall has an outer circumferential portion that is fluid-tightly fit between the front shell and the rear shell. A rear movable wall has an outer circumferential portion that is positioned at the stepped portion of the rear shell, and a fixed wall has an outer circumferential portion that is positioned between the front movable wall and the rear shell. The fixed wall includes a bent portion which presses the outer circumferential portion of the rear movable wall to the stepped portion of the rear shell. The fixed wall further includes a through hole positioned between the circumferential portion and the bent portion thereof.

In accordance with another aspect of the invention, a tandem vacuum booster includes a front shell and a rear shell, with the rear shell having a stepped portion, a first shoulder portion and a second shoulder portion. The rear shell is in contact with the outer circumferential portion of the front shell at the first shoulder portion so that the front and rear shells form a housing. A front movable wall has an outer circumferential portion that is fluid-tightly fit between the outer circumferential portion of the front shell and the second shoulder portion of the rear shell. A rear movable wall has an outer circumferential portion that is positioned at the stepped portion of the rear shell, and a fixed wall has an outer circumferential portion that is fit between the from movable wall and the rear shell. The fixed wall includes a bent portion which presses the outer circumferential portion of the rear movable wall to the stepped portion of the rear shell, and a through hole disposed between the circumferential portion of the fixed wall and the bent portion of the fixed wall.

BRIEF DESCRIPTION OF THE DRAWING FIGURES

The features and advantages of the tandem vacuum booster according to the present invention will be more clearly appreciated from the following detailed description considered in conjunction with the accompanying drawing figures in which like elements are designated with like reference numerals and wherein.

DETAILED DESCRIPTION OF PREFERRED EMBODIMENTS OF THE INVENTION

Figure 1:
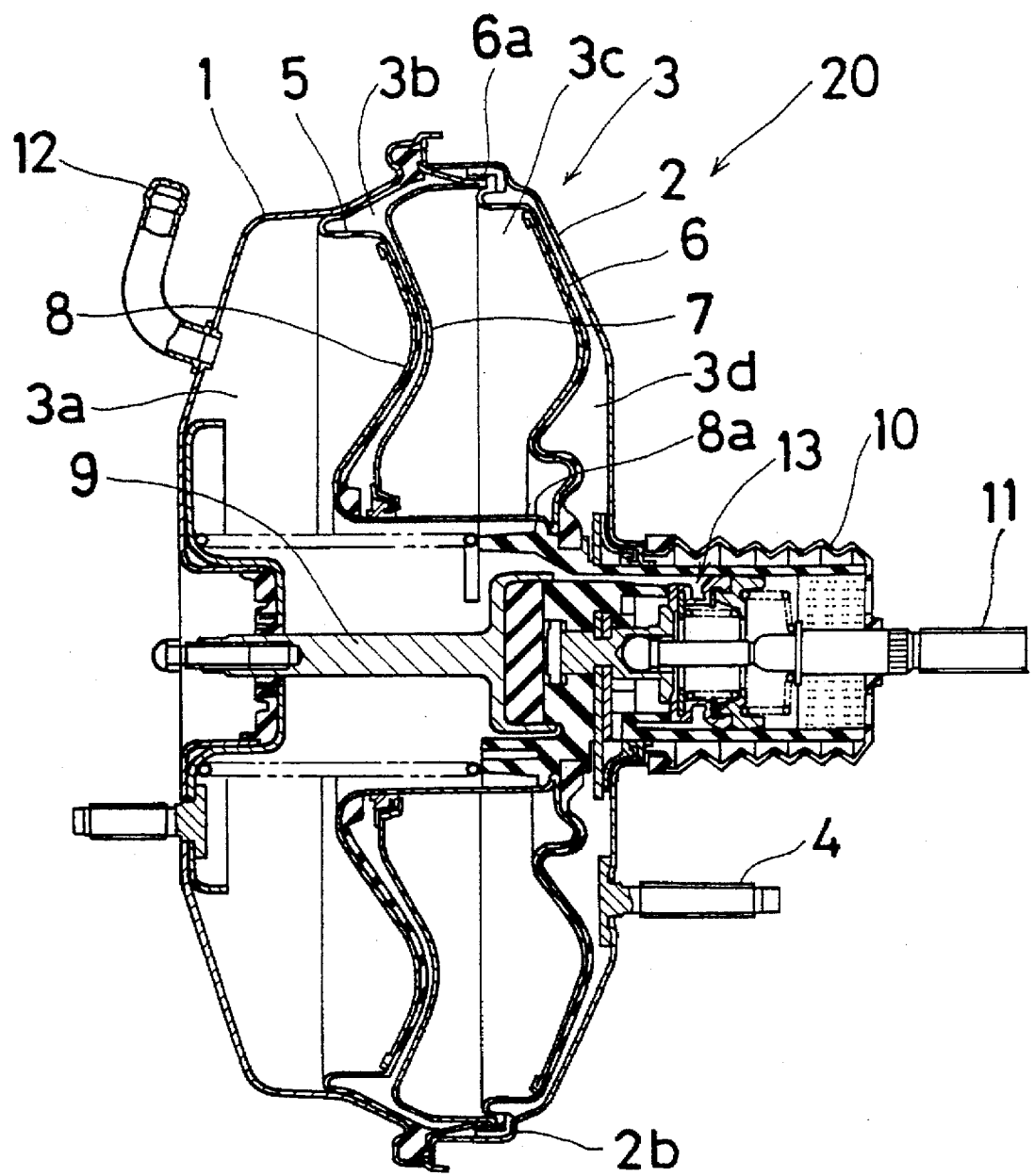
FIG. 1 is a cross-sectional view of a tandem vacuum booster according to a first embodiment of the present invention.

With reference to FIG. 1, a tandem vacuum booster 20 according to a first embodiment of the present invention includes a front shell 1 and a rear shell 2. As shown in more detail in FIG. 2, the outer circumferential end 2a of the rear shell 2 is in contact with a shoulder portion 1a of the front shell 1 so that the front and rear shells form a housing 3. The tandem vacuum booster 20 also includes a plurality of stud bolts 4 installed on the rear shell 2. The stud bolts 4 are adapted to be inserted through the dash panel (not shown) of a vehicle to fix the tandem vacuum booster 20 to the vehicle.

A front diaphragm 5 is provided to separate or divide the front portion of the interior of the housing 3 into a front constant pressure chamber 3a and a front variable pressure chamber 3b. Also, a rear diaphragm 6 separates or divides the rear portion of the interior of the housing 3 into a rear constant pressure chamber 3c and a rear variable pressing chamber 3d. The front diaphragm 5 is fluid tightly fit between the front shell 1 and the rear shell 2 at its outer circumferential end. As can be seen from FIG. 2, the outer circumferential end portion of the front shell 1 is bent back on itself towards the forward direction (i.e., towards the left as seen in FIG. 2), is bent upwards and then is bent back towards the rearward direction to define a space between the outer circumferential end portion of the front shell 1 and the outer circumferential end portion of the rear shell 2 in which is fluid-tightly fit the outer circumferential end of the front diaphragm 5.

On the other hand, the rear diaphragm 6 is positioned at and fixed to a stepped portion 2b of the rear shell 2 at its outer circumferential end. A fixed wall 7 is disposed between the front diaphragm 5 and the rear diaphragm 6 to fluid-tightly separate the front variable pressure chamber 3b from the rear constant pressure chamber 3c.

Figure 2:
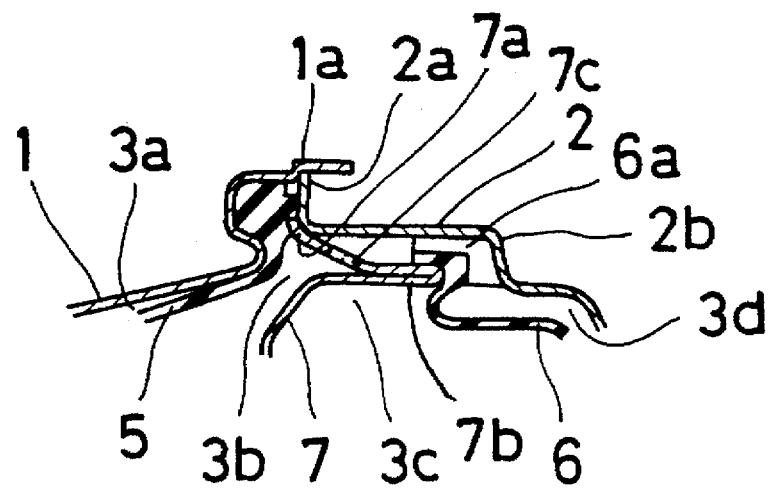
FIG. 2 is an enlarged detailed cross-sectional view of FIG. 1.

As shown in FIG. 2, the outer circumferential end 7a of the fixed wall 7 is fit between the front diaphragm 5 and the rear shell 2. The fixed wall 7 is provided with a bent portion 7b disposed at an outer circumferential portion of the fixed wall 7. This bent portion 7b presses the rear diaphragm 6 to the stepped portion 2b of the rear shell 2. In accordance with the above construction, the fixed wall 7 is fixed at the housing 3. The fixed wall 7 further includes a through hole 7c between the outer circumferential end 7a of the fixed wall 7 and the bent portion 7b of the fixed wall 7 to permit air flow into the front variable pressure chamber 3b.

The rear diaphragm 6 includes a plurality of through slits 6a on its outer circumferential end for effecting air communication between the front variable pressure chamber 3b and the rear variable pressure chamber 3d. A front wall member 8 is provided and is movable with the from diaphragm 5. This front wall member 8 includes an air hole 8a to fluidly connect the front constant pressure chamber 3a and the rear constant pressure chamber 3c.

An output rod 9 extends in the front or forward direction and projects out of the front shell 1 for being operatively connected to the piston of a brake master cylinder (not shown). Further, a push rod 11 protruding from a boot 10 is connected to the brake pedal (not shown) of the vehicle. The push rod 11 is moved in the front or forward direction by the depression of the brake pedal. A connector 12 is mounted on a front side of the front shell 1 and is connected to the intake manifold of the engine (not shown) of the vehicle to supply negative pressure into the housing 3.

In accordance with the tandem vacuum booster 20 of the present invention, when the brake pedal is operated, the push rod 11 is moved in the forward direction (i.e., to the left in FIG. 1) to supply a quantity of air to the rear variable pressure chamber 3d through a valve mechanism 13 and to the front variable pressure chamber 3b through the slits 6a of the rear diaphragm 6 according to the operation force of the brake pedal. The air supplied to the front variable pressure chamber 3b immediately fills the entire front variable pressure chamber 3b.

At the same time, the negative pressure generated in the intake manifold is applied to the front constant pressure chamber 3a through the connector 12 and to the rear constant pressure chamber 3c through the air hole 8a. The output rod 9 is moved in the forward direction by the boost force caused by the pressure differentials between the front constant pressure chamber 3a and the front variable pressure chamber 3b, and between the rear constant pressure chamber 3c and the rear variable pressure chamber 3d generated according to the operation force of the brake pedal. Thus, the output rod 9 pushes the piston of the master cylinder to generate brake pressure. Since other features and structural aspects of the tandem vacuum booster of the present invention are similar to those of the conventional tandem vacuum booster, a detailed explanation of such features and structure is not set forth here.

Figure 3:
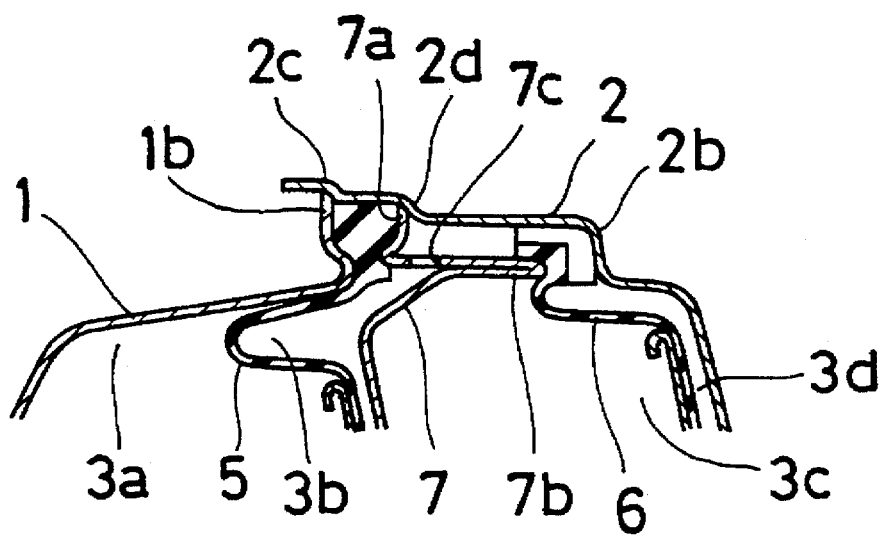
FIG. 3 is an enlarged detailed cross-sectional view of a tandem vacuum booster according to a second embodiment of the present invention.

With reference to FIG. 3, a tandem vacuum booster according to the second embodiment of the present invention is shown. In accordance with the second embodiment, the outer circumferential end 1b of the front shell 1 is in contact with a first shoulder portion 2c of the rear shell 2 to engage the front shell 1 with the rear shell 2. The outer circumferential end 7a of the fixed wall 7 engages a second shoulder portion 2d of the rear shell 2. Further, the outer circumferential end of the from diaphragm 5 is positioned in a fluid tight manner between the outer circumferential end 1b of the front shell 1 and the second shoulder portion 2d of the rear shell 2, with the outer circumferential end of the front diaphragm 5 engaging the outer circumferential end 7a of the fixed wall 7. The fixed wall 7 of the second embodiment includes a through hole 7c between the outer circumferential end 7a and the bent portion 7b in the same manner as the fixed wall 7 of the first embodiment.

In accordance with the tandem vacuum booster of the present invention, since the fixed wall dividing the housing interior into two portions is formed by a single plate member, the manufacturing cost of the tandem vacuum booster can advantageously be reduced. The manufacturing cost can be further reduced by virtue of the fact that the fixed wall can be made by a pressing process without the need for a welding process. The structure of the tandem vacuum booster is also simplified since no convex portion is provided on the outer circumferential surface of the shells.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A tandem vacuum booster comprising:

a front shell including a shoulder portion;

a rear shell including a stepped portion and an outer circumferential portion that is in contact with the shoulder portion of the front shell to form a housing;

a front movable wall having an outer circumferential portion that is fluid-tightly fit between the front shell and the outer circumferential portion of the rear shell, the front movable wall separating a front interior portion of the housing into a front constant pressure chamber and a front variable pressure chamber;

a rear movable wall having an outer circumferential portion that is positioned at the stepped portion of the rear shell, the rear movable wall separating a rear interior portion of the housing into a rear constant pressure chamber and a rear variable pressure chamber; and a fixed wall having an outer circumferential portion that is positioned between the front movable wall and the outer circumferential portion of the rear shell, the fixed wall including a bent portion positioned radially inwardly with respect to the outer circumferential portion of the fixed wall to press the outer circumferential portion of the rear movable wall to the stepped portion of the rear shell, the fixed wall further including a through hole positioned between the circumferential portion of the fixed wall and the bent portion of the fixed wall for providing communication between the front variable pressure chamber and the rear variable pressure chamber through an annular space defined between the bent portion and the rear shell.

2. A tandem vacuum booster as recited in claim 1, wherein said rear movable wall includes at least one slit for providing communication between the annular space and the rear variable pressure chamber.

3. A tandem vacuum booster as recited in claim 1, wherein said front shell is provided with a bent portion for defining a space in which the outer circumferential portion of the front movable wall is fluid-tightly fit.

4. A tandem vacuum booster as recited in claim 1, wherein said fixed wall is a single plate member formed by a pressing process.

5. A tandem vacuum booster comprising:

a front shell including an outer circumferential portion;

a rear shell including a stepped portion, a first shoulder portion and a second shoulder portion, the second shoulder portion being positioned between the stepped portion of the rear shell and the first shoulder portion of the rear shell, the rear shell being in contact with the outer circumferential portion of the front shell at the first shoulder portion of the rear shell to form a housing;

a front movable wall having an outer circumferential portion that is fluid-tightly fit between the outer circumferential portion of the front shell and the second shoulder portion of the rear shell, the front movable wall separating a front interior portion of the housing into a front constant pressure chamber and a front variable pressure chamber;

a rear movable wall having an outer circumferential portion that is positioned at the stepped portion of the rear shell, the rear movable wall separating a rear interior portion of the housing into a rear constant pressure chamber and a rear variable pressure chamber; and a fixed wall having an outer circumferential portion that is fit between the outer circumferential portion of the front movable wall and the second shoulder portion of the rear shell, the fixed wall including a bent portion positioned radially inwardly with respect to the outer circumferential portion of the fixed wall, the bent portion pressing the outer circumferential portion of the rear movable wall to the stepped portion of the rear shell, the fixed wall further including a through hole positioned between the outer circumferential portion of the fixed wall and the bent portion of the fixed wall for providing communication between the front variable pressure chamber and the rear variable pressure chamber through an annular space defined between the bent portion of the fixed wall and the rear shell.

6. A tandem vacuum booster as recited in claim 5, wherein said rear movable wall includes at least one slit for providing communication between the annular space and the rear variable pressure chamber.

7. A tandem vacuum booster as recited in claim 5, wherein said fixed wall is a single plate member formed by a pressing process.

* * * * *